US011859435B2

(12) United States Patent
Stabile

(10) Patent No.: US 11,859,435 B2
(45) Date of Patent: Jan. 2, 2024

(54) SLIDING SASH ASSEMBLIES

(71) Applicant: Leonardo Stabile, Stoney Creek (CA)

(72) Inventor: Leonardo Stabile, Stoney Creek (CA)

( * ) Notice: Subject to any disclaimer, the term of this patent is extended or adjusted under 35 U.S.C. 154(b) by 0 days.

(21) Appl. No.: 17/960,267

(22) Filed: Oct. 5, 2022

(65) Prior Publication Data

US 2023/0110893 A1 Apr. 13, 2023

Related U.S. Application Data

(60) Provisional application No. 63/262,287, filed on Oct. 8, 2021.

(51) Int. Cl.

| | |
|---|---|
| ***E05F 5/00*** | (2017.01) |
| ***E05C 17/60*** | (2006.01) |
| *E05C 7/00* | (2006.01) |

(52) U.S. Cl.

CPC .............. *E05F 5/003* (2013.01); *E05C 17/60* (2013.01); *E05D 13/04* (2013.01); *E05C 2007/007* (2013.01)

(58) Field of Classification Search

CPC .... E05C 17/60; E05C 17/02; E05C 2007/007; Y10S 292/47; E05B 65/0852; E05F 2700/04; E05F 5/003

See application file for complete search history.

(56) References Cited

U.S. PATENT DOCUMENTS

| | | | | |
|---|---|---|---|---|
| 2,011,455 A * | 8/1935 | Ostermann | E05D 13/06 | 292/213 |
| 2,143,272 A * | 1/1939 | Kleb | E05F 11/00 | 292/109 |
| 3,083,045 A * | 3/1963 | Linderoth | E05B 65/0847 | 49/413 |
| 3,151,901 A * | 10/1964 | Aldgren | E05D 13/04 | 292/124 |
| 5,553,903 A * | 9/1996 | Prete | E05B 9/08 | 292/138 |
| 5,806,900 A * | 9/1998 | Bratcher | E05B 65/0864 | 292/DIG. 47 |
| 6,854,214 B2 * | 2/2005 | Polowinczak | E05B 65/0864 | 49/449 |
| 7,637,544 B2 * | 12/2009 | Liang | E05C 17/50 | 292/DIG. 31 |
| 8,789,862 B2 * | 7/2014 | Liang | E05C 3/14 | 292/300 |

(Continued)

*Primary Examiner* — Justin B Rephann

(74) *Attorney, Agent, or Firm* — BERESKIN & PARR LLP/S.E.N.C.R.L., s.r.l.

(57) ABSTRACT

A sliding sash assembly for use as a door or window includes: (a) a frame defining a frame opening; (b) a pair of sashes mounted in the frame opening and slidable relative to each other along an opening axis between a closed position and an open position; and (c) at least one stop device including a housing and a pair of depressible stop members movably mounted in the housing. The stop members are spaced apart from each other along the opening axis. Each stop member is selectively movable independent of the other stop member between a retracted position in which the stop member is retracted into the housing and an advanced position in which the stop member projects from the housing for engagement with one of the sashes to restrict movement of the sashes relative to each other toward the open position.

14 Claims, 9 Drawing Sheets

(56) References Cited

U.S. PATENT DOCUMENTS

| | | | | |
|---|---|---|---|---|
| 8,806,809 | B1 * | 8/2014 | Lawrence | E05C 17/60<br>292/DIG. 47 |
| 8,881,461 | B2 * | 11/2014 | Derham | E05B 65/0852<br>292/338 |
| 9,404,288 | B2 * | 8/2016 | Curtis | E06B 3/4415 |
| 10,119,311 | B2 | 11/2018 | Piltingsrud | |
| 11,156,024 | B1 * | 10/2021 | Lawrence | E05C 17/50 |
| 11,168,495 | B1 * | 11/2021 | Liang | E05B 63/20 |
| 2005/0146143 | A1 * | 7/2005 | Lutfallah | E05C 17/48<br>292/153 |
| 2008/0129054 | A1 * | 6/2008 | Tremble | E05B 63/00<br>292/138 |
| 2010/0300000 | A1 * | 12/2010 | Liang | E05B 65/0829<br>292/164 |
| 2012/0144752 | A1 * | 6/2012 | Piltingsrud | E05C 17/02<br>49/506 |
| 2012/0167475 | A1 * | 7/2012 | Sopkowiak | E05C 17/60<br>49/506 |
| 2015/0159429 | A1 * | 6/2015 | Lund | E05C 17/50<br>292/300 |
| 2018/0209186 | A1 * | 7/2018 | Van Essen | E05C 17/02 |
| 2021/0025197 | A1 | 1/2021 | Hamand et al. | |

* cited by examiner

SLIDING SASH ASSEMBLIES

RELATED APPLICATIONS

This application claims the benefit of U.S. Provisional Application Ser. No. 63/262,287, filed Oct. 8, 2021, which is hereby incorporated herein by reference.

FIELD

The specification relates generally to windows and doors, and more specifically, to sliding sash assemblies for use as windows or doors.

BACKGROUND

U.S. Pat. App. Pub. No. 2021/0025197 (Hamand et al.) discloses a lock kit for a fenestration assembly includes a panel stop. The fenestration assembly includes a first panel and a second panel, at least one of the first and second panels being slideable relative the other of the first and second panels. The panel stop is configured to pivotably mount within a recess of a frame member of the first panel and pivot between a first stop position configured to maintain the first and second panels in a fully closed position, a second stop position configured to limit sliding of the first and second panels beyond a preset partially-open position, and a third position substantially within the recess, the third position being configured to not restrict a range of motion of the first and second panels.

U.S. Pat. No. 10,119,311 (Piltingsrud) discloses a method of operating a window having a sash and a window opening limit device includes moving the sash from a closed position to a limited position. When in the limited position, the window opening limit device is in a projected position, and the sash is engaged with the window opening limit device. Moving the window opening limit device to a retracted position disengages the sash and the window opening limit device. The sash may then be moved from the limited position to an open range. When the sash is returned to the closed position, the window opening limit device automatically returns to the projected position, and the sash is disengaged with the window opening limit device.

SUMMARY

The following summary is intended to introduce the reader to various aspects of the applicant's teaching, but not to define any invention.

According to some aspects, a sliding sash assembly for use as a door or window includes: (a) a frame defining a frame opening; and (b) a pair of sashes mounted in the frame opening. The pair of sashes include a first sash and a second sash slidable relative to each other along an opening axis between a closed position, in which the pair of sashes are extended relative to each other along the opening axis to cover the frame opening, and an open position, in which the pair of sashes are retracted relative to each other along the opening axis for uncovering a first extent of the frame opening. The second sash sweeps a travel path relative to the first sash when the sashes are moved from the closed position to the open position relative to each other. The sash assembly further includes (c) at least one stop device including a housing fixed to the first sash and a pair of depressible stop members movably mounted in the housing. The stop members are spaced apart from each other along the opening axis. Each stop member is selectively movable independent of the other stop member between a retracted position, in which the stop member is retracted into the housing clear of the travel path of the second sash, and an advanced position in which the stop member projects from the housing at a corresponding stop position along the opening axis into the travel path of the second sash for engagement with the second sash to restrict movement of the pair of sashes relative to each other toward the open position.

In some examples, the stop members include a first stop member and a second stop member. The stop position of the first stop member corresponds to the closed position to prevent movement of the pair of sashes from the closed position, and the stop position of the second stop member corresponds to a partially-open position of the pair of sashes. The partially-open position is between the open and closed positions for uncovering a second extent of the frame opening. The second extent is less than the first extent. In some examples, the second extent is equal to or less than 4 inches.

In some examples, each stop member is translatable between the retracted and advanced positions along a corresponding stop member axis extending perpendicular to the opening axis.

In some examples, the stop device includes a pair of springs in the housing, each spring biasing a corresponding stop member toward the advanced position.

In some examples, the stop device includes a pair of push-activated latch mechanisms. Each latch mechanism operable to selectively maintain a corresponding stop member in the retracted position and selectively release the stop member from the retracted position for biased movement toward the advanced position.

In some examples, each sash has an inboard face directed toward the other sash and an outboard face opposite the inboard face, and the stop device is mounted to the inboard face of the first sash. In some examples, the first sash has a mounting aperture in the inboard face, and the housing is positioned in the mounting aperture. In some examples, the housing is secured in the mounting aperture through a snap-fit connection. In some examples, the housing has a pair of cavities spaced apart from each other along the opening axis and open normal to the inboard face of the first sash. Each stop member is positioned in a corresponding cavity.

In some examples, the housing is of integral, unitary, one-piece construction.

In some examples, the sash assembly includes a pair of the stop devices spaced apart from each other across the frame opening perpendicular to the opening axis, and the stop positions of each stop device are in alignment with the stop positions of the other stop device along the opening axis.

According to some aspects, a sliding sash assembly for use as a door or window includes: (a) a frame defining a frame opening; (b) a pair of sashes mounted in the frame opening and slidable relative to each other along an opening axis between a closed position and an open position; and (c) at least one stop device mounted adjacent one of the sashes. The stop device includes a housing and a pair of depressible stop members movably mounted in the housing. The stop members are spaced apart from each other along the opening axis. Each stop member is selectively movable independent of the other stop member between a retracted position in which the stop member is retracted into the housing clear of the one of the sashes when the sashes move between the open and closed positions, and an advanced position in which the stop member projects from the housing for engagement with the one of the sashes to restrict movement of the sashes relative to each other toward the open position.

According to some aspects, a stop device for a sliding sash assembly is disclosed. The sliding sash assembly is for use as a door or window and includes a frame defining a frame opening and a pair of sashes mounted in the frame opening and slidable relative to each other along an opening axis between a closed position and an open position. The stop device includes: (a) a housing extending along a housing axis for mounting adjacent a travel path of one of the sashes with the housing axis extending parallel with the opening axis; and (b) a pair of depressible stop members movably mounted in the housing. The stop members are spaced apart from each other along the housing axis. Each stop member is translatable perpendicular to the housing axis independent of the other stop member between a retracted position in which the stop member is retracted into the housing for being clear of the travel path, and an advanced position in which the stop member projects from the housing into the travel path for engagement with the one of the sashes to limit movement of the sashes relative to each other toward the open position.

BRIEF DESCRIPTION OF THE DRAWINGS

The drawings included herewith are for illustrating various examples of apparatuses and methods of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Figure 1:
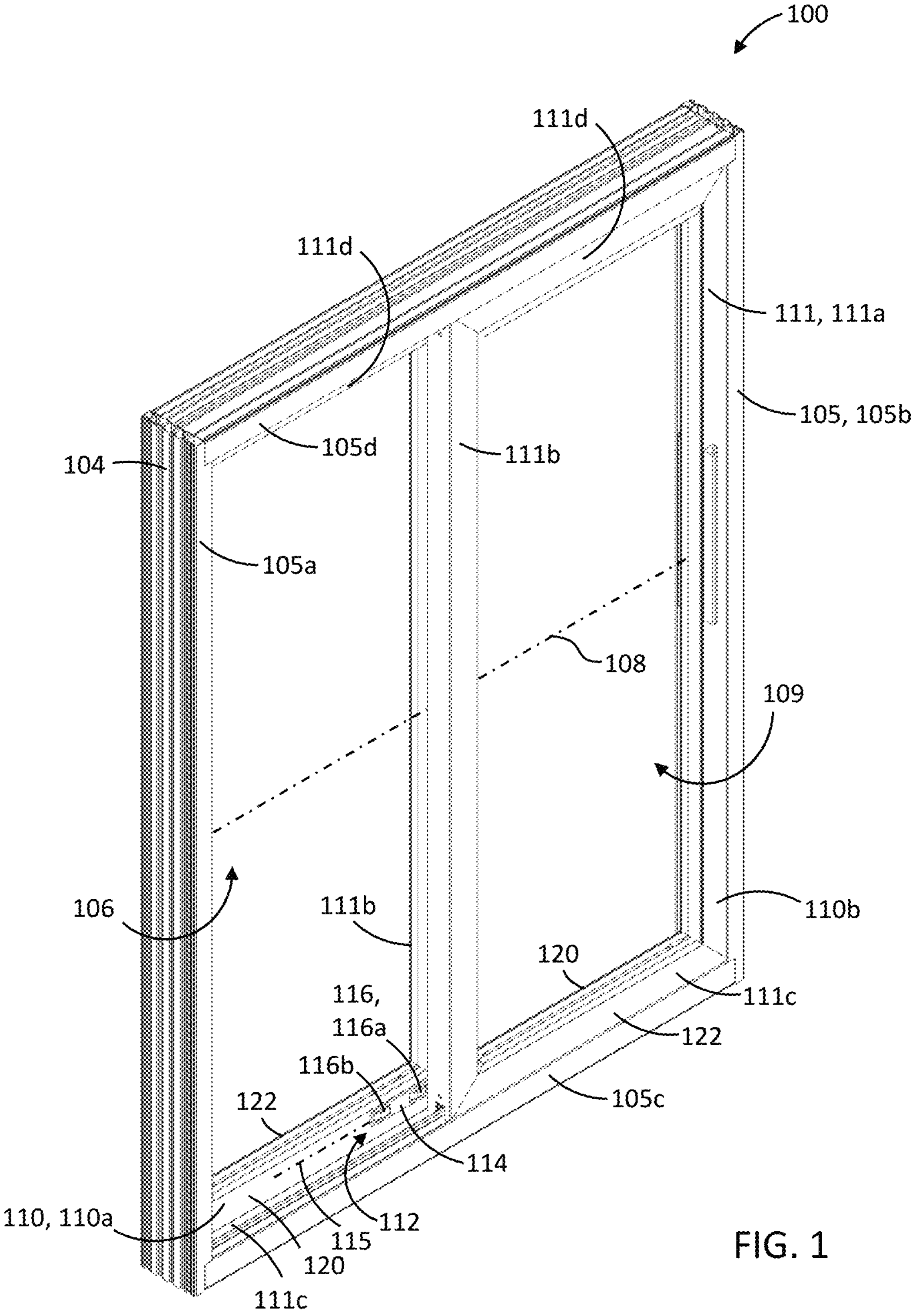
FIG. 1 is a front perspective view of an example sliding sash assembly shown in a closed configuration.
Figure 2:
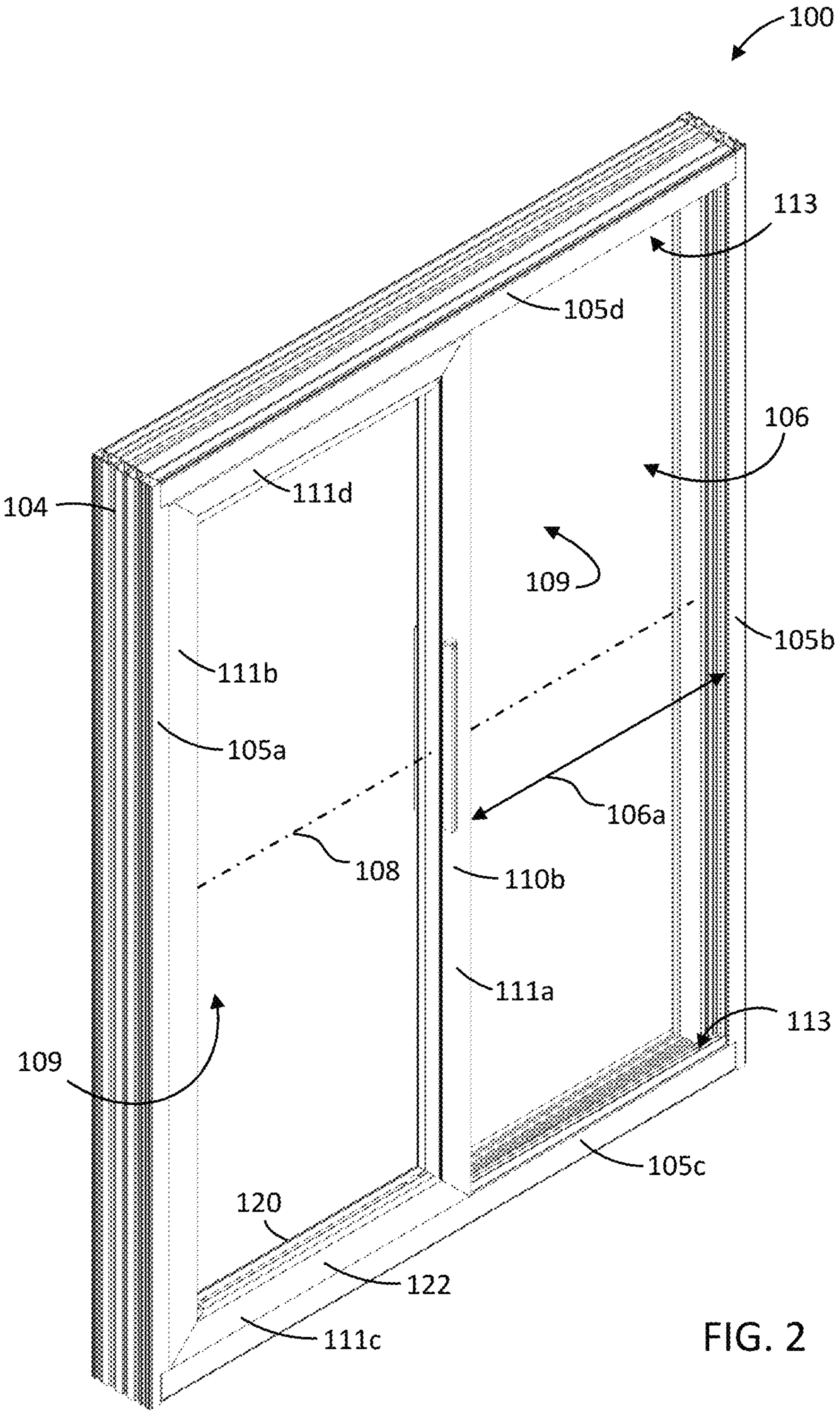
FIG. 2 is a perspective view of the sliding sash assembly of FIG. 1, but shown in an open configuration.

Referring to FIG. 1, an example sliding sash assembly 100 is illustrated. In the example illustrated, the sliding sash assembly 100 is configured for use as a sliding door. The sliding sash assembly 100 is configured for installation in a wall separating an interior space from an exterior space, with an exterior face of the assembly 100 directed toward the exterior space, and an interior face of the assembly 100 directed toward the interior space. The sliding sash assembly 100 includes an assembly frame 104 defining a frame opening 106 (i.e. a doorway in the example illustrated), and a pair of sashes 110 mounted in the frame opening 106. At least one of the sashes 110 is slidable relative to the frame 104 along an opening axis 108. The pair of sashes 110 include a first sash 110*a* and a second sash 110*b*. In the example illustrated, the first sash 110*a* is fixed in position relative to the assembly frame 104, and the second sash 110*b* is slidable relative to the frame 104 along the opening axis 108 between a closed position (shown in FIG. 1) and an open position (shown in FIG. 2). In some examples, both sashes can be operable for selectively closing and opening the doorway. Referring to FIG. 1, when in the closed position, the second (operable) sash 110*b* is aligned with, and covers, an opening between the fixed sash 110*a* and a distal (second) jamb member 105*b*. Referring to FIG. 2, when in the open position, the operable sash 110*b* is retracted away from the second jamb 105*b*, uncovering a first portion of the frame opening 106 (defined, in the illustrated example, by the horizontal extent 106*a*).

Referring to FIG. 1, in the example illustrated, the assembly frame 104 includes a plurality of assembly frame members 105 extending about and defining the assembly frame opening 106. The assembly frame members 105 include a pair of first and second vertical jamb members 105*a*, 105*b* spaced horizontally apart from each other, and a pair of horizontal members including a sill 105*c* and a header 105*d*, spaced vertically apart from each other and joined at opposed ends to the first and second jamb members 105*a*, 105*b*.

In the example illustrated, each sash 110 includes a plurality of sash frame members 111 extending about and defining a sash opening 109 in which, in the example illustrated, a glazing unit is mounted. The plurality of sash frame members 111 includes a pair of first and second vertical stiles 111*a*, 111*b* spaced horizontally apart from each other, and a pair of third and fourth (lower and upper) horizontal rails 111*c*, 111*d* spaced vertically apart from each other with opposed ends joined to the first and second stiles 111*a*, 111*b*. The first stile 111*a* of each of the first and second sashes 110*a*, 110*b* is positioned toward the first and second jamb members 105*a*, 105*b*, respectively, for engagement therewith when the sashes 110 are in the closed position. The second stiles 111*b* of the first and second sashes are located axially inwardly of the respective first stiles 111*a*.

In the example illustrated, when the assembly 100 is in the closed position, the first stile 111*a* of the first sash 110*a* is in engagement with the first jamb member 105*a*, the first stile 111*a* of the second sash 110*b* is in engagement with the second jamb member 105*b*, and the second stiles 111*b* of the first sash 110*a* and the second sash 110*b* overlap and inter-engage with each other. In the example illustrated, the second stiles 111*b* include inter-engaging features to hold the second stiles 111*b* of the sashes 110 snugly together (typically with weatherstripping disposed therebetween) and help seal out the weather. When the operable sash 110*b* is in the open position, the first stile 111*a* of the second sash 110*b* is spaced apart from the second jamb member 105*b* by, for example, the first extent 106*a* (FIG. 2).

In the example illustrated, when the operable sash 110*b* is moved from the closed position to the open position, the operable sash 110*b* slides along a travel path parallel to the axis 108 relative to the first sash 110*a*. More particularly, with reference to FIG. 2, in the example illustrated, the header and sill 105*c*, 105*d* provide a track 113 to retain the operable sash 110*b* in sliding engagement within the assembly frame 104. The track 113 can include elongate tongue and groove members oriented parallel to the opening axis 108. The lower and upper rails 111*c*, 111*d* of the operable sash 110*b* can include complementary tongue and groove members, also oriented parallel to the opening axis 108, and in sliding engagement with the tongue and groove members of the track 113 of the frame assembly 104. The track 113 defines the travel path of the second sash 110*b* and is offset toward the interior face of the assembly 100 relative to the first sash 110*a*. During opening, the second sash 110*b* slides in front of the first sash (when viewed from the interior side), with a rear (exterior-facing) surface of the second sash 110*b* sliding along, and/or in close proximity to, a front (interior-facing) surface of the first sash 110*a*.

Referring to FIG. 1, in the example illustrated, the sliding sash assembly 100 includes at least one stop device 112. In the example illustrated, the stop device 112 is mounted to the first (fixed) sash 110*a*, and in the example illustrated, is mounted along a front (interior-facing) surface of the lower rail 111*c* of the first sash 110*a*. The stop device 112 is positioned axially between a first end of the lower rail 111*c* joined to the first stile 111*a* of the first sash 110*a*, and a second end of the lower rail 111*c* joined to the second stile 111*b* of the first sash 110*a*. When the second sash 110*b* is in the closed position, the stop device 112 is positioned axially (along axis 108) between the first jamb member 105*a* of the assembly frame 104 and the second stile 111*b* of the second sash 110*b*.

Figure 5A:
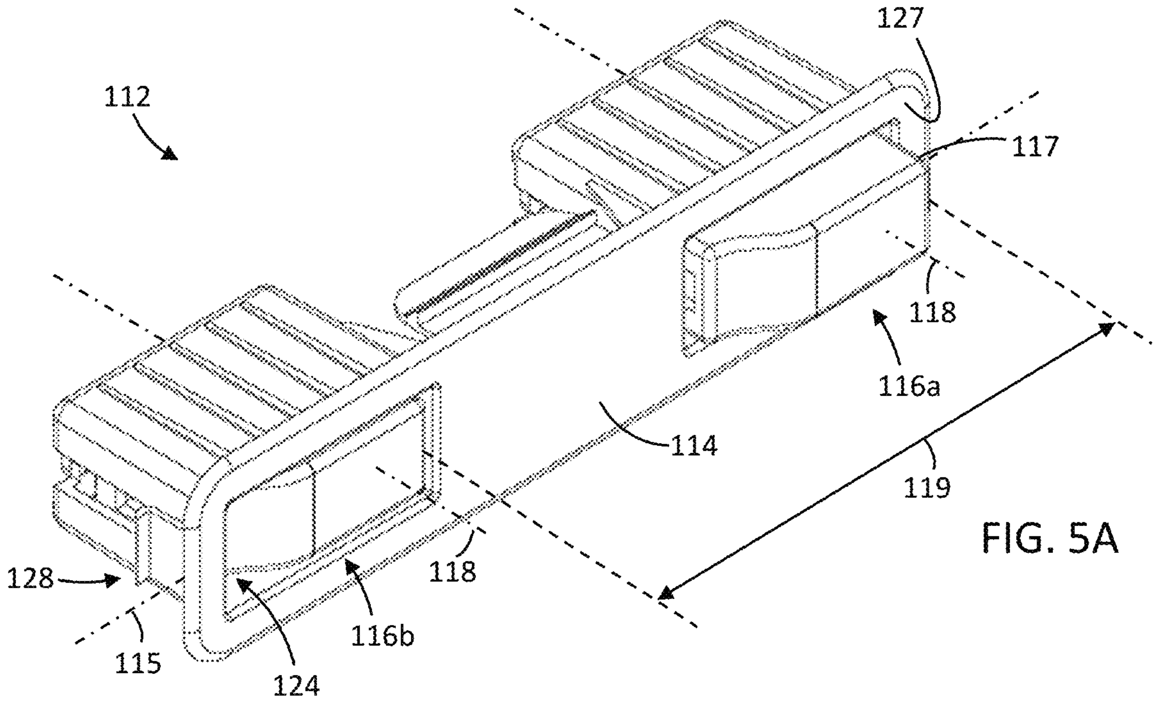
FIG. 5A is a perspective view of a stop device of the sliding sash assembly of FIG. 1, showing a first stop member of the stop device in an advanced position and a second stop member of the stop device in a retracted position.
Figure 5B:
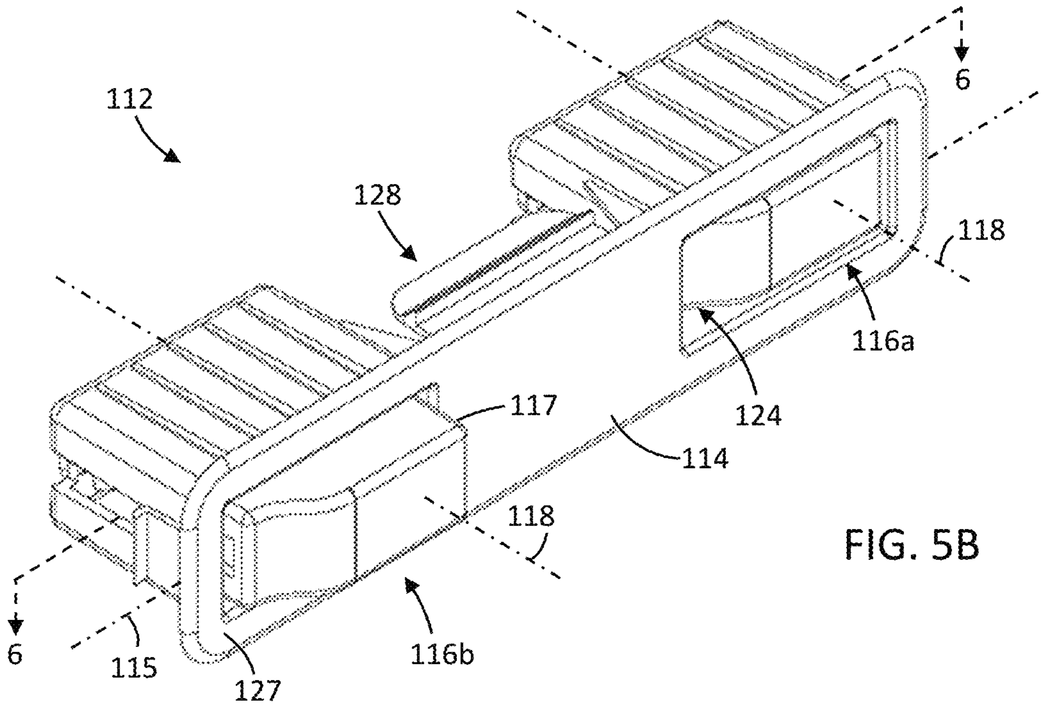
FIG. 5B is a perspective view like that of FIG. 5A, but showing the first stop member in the retracted position and the second stop member in the advanced position.

In the example illustrated, the stop device 112 has a housing 114 fixed to the first sash 110*a*, and extending along a housing axis 115. In the example illustrated, the housing axis 115 extends parallel with the opening axis 108. In the example illustrated, the stop device 112 further includes a pair of depressible stop members 116 movably mounted in the housing 114. In the example illustrated, the stop members 116 include a first stop member 116*a* and a second stop member 116*b* spaced apart from each other along the axis 108 (and the housing axis 115). Each stop member 116 is selectively movable independent of the other stop member 116 between a retracted position and an advanced position. Referring to FIG. 5A, when the stop member 116 is in the retracted position (see e.g. the second stop member 116*b* in FIG. 5A and the first stop member 116*a* in FIG. 5B), the stop member 116 is retracted into the housing 114 clear of the travel path of the second sash 110*b* (FIG. 1). When in the advanced position (see e.g., the first stop member 116*a* in FIG. 5A and the second stop member 116*b* in FIG. 5B), the stop member 116 projects from the housing 114 at a corresponding stop position along the opening axis 108 into the travel path of the second sash 110*b* for engagement with the second sash 110*b* to restrict movement of the pair of sashes 110 toward the open position. In the example illustrated, each stop member 116 is translatable between the retracted and advanced positions along a corresponding stop member axis 118 extending perpendicular to the opening axis 108 (and the housing axis 115).

Figure 3:
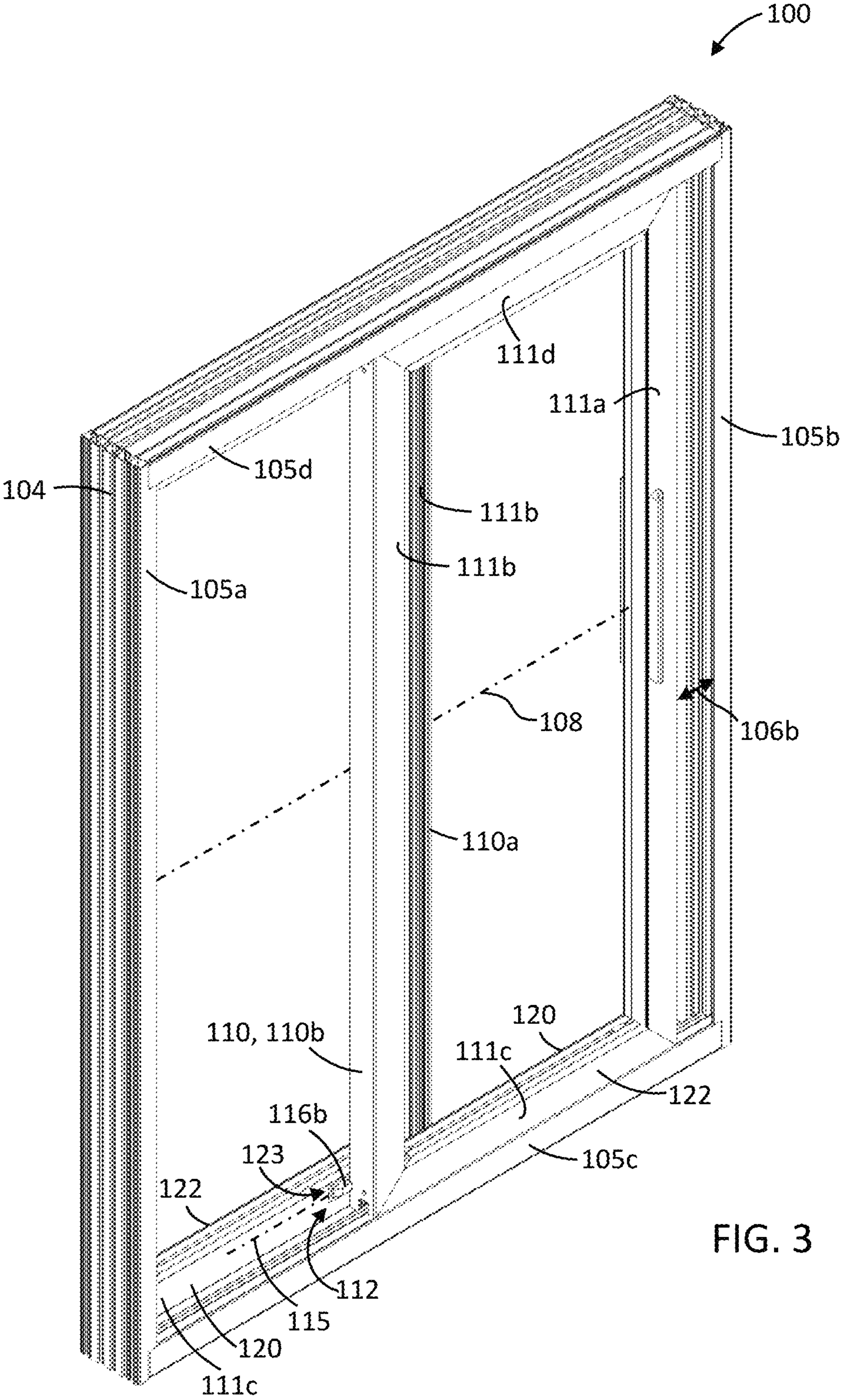
FIG. 3 is a perspective view of the sliding sash assembly of FIG. 1, but shown in a partially-open configuration.

Referring to FIG. 1, the stop position of the first stop member 116*a* corresponds to the closed position to prevent movement of the pair of sashes 110 from the closed position. In the example illustrated, the stop position of the first stop member 116*a* is immediately adjacent the second stile 111*b* of the second sash 110*b* when the sashes 110 are in the closed position. Referring to FIG. 3, the stop position of the second stop member 116*b* corresponds to a partially-open position of the pair of sashes 110. The partially-open position is between the open and closed positions for uncovering a second extent 106*b* of the frame opening 106 that is less than the first extent 106*a*.

In the example illustrated, when the sashes 110 are in the partially-open position, the first stile 111*a* of the second sash 110*b* is spaced apart from the second jamb member 105*b* by the second extent 106*b* of the frame opening 106. In the example illustrated, the second extent 106*b* extends along the opening axis 108 between the first stile 111*a* of the second sash 110*b* and the second jamb member 105*b*. The second extent 106*b* can be, for example, equal to or less than 4 inches (about 10 cm). In the example illustrated, each stop member 116 has an abutment surface 117 directed generally perpendicular to the opening axis 108 toward the second sash 110*b* (when the sashes 110 are in the closed position) for engagement with a horizontally inward surface of the stile 111*b* of the second sash 110*b* at a corresponding stop position. The abutment surfaces 117 of the stop members 116*a*, 116*b* are spaced apart from each other along the opening axis 108 by an abutment surface spacing 119 (FIG. 5A) corresponding to the second extent 106*b*. In some examples, the abutment surface spacing 119 is greater than the second extent 106*b* to, for example, accommodate the second sash 110*b* being received in a pocket of the second jamb member 105*b*. For example, in examples in which the second extent 106*b* is about 4 inches, the abutment surface spacing 119 can be, for example, 4.75 to 5 inches (e.g. to accommodate a pocket depth in the second jamb member 105*b* of about 0.75 to 1 inches). When the sashes 110 are in the partially-open position, the first stile 111*a* of the second sash 110*b* is positioned along the opening axis 108 between the first stile 111*a* of the first sash 110*a* and the second jamb member 105*b*, and the second stile 111*b* of the second sash 110*b* is positioned along the opening axis 108 between the first and second stiles 111*a*, 111*b* of the first sash 110*a*.

In the example illustrated, each sash 110 has an inboard face 120 directed toward the other sash 110 and an outboard face 122 opposite the inboard face 120. The inboard face 120 of the first sash 110*a* and the outboard face 122 of the second sash 110*b* are directed toward the interior space and define a portion of the interior face of the assembly 100. The outboard face 122 of the first sash 110*a* and the inboard face 120 of the second sash 110*b* are directed toward the exterior space and define a portion of the exterior face of the assembly 100. In the example illustrated, the stop device 112 is mounted to the inboard face 120 of the first sash 110*a*, and the stop member axis 118 (FIG. 5A) is perpendicular to the inboard face 120 of the first sash 110*a*. In the example illustrated, each stop member 116 is generally flush with, or retracted relative to, the inboard face 120 of the first sash 110*a* when in the retracted position to permit translation of the inboard face 120 of the second sash 110*b* past the stop member 116. Each stop member 116 projects forward (interiorly) from the inboard face 120 of the first sash 110*a* when in the advanced position, into the opening path for engagement with a leading outer surface of the second stile 111*b* of the second sash 110*b*.

In the example illustrated, a mounting aperture 123 (FIG. 3) is provided in the inboard face 120 of the first sash 110*a*, and the housing 114 is positioned in the mounting aperture 123 clear of the travel path of the second sash 110*b*.

Figure 6:
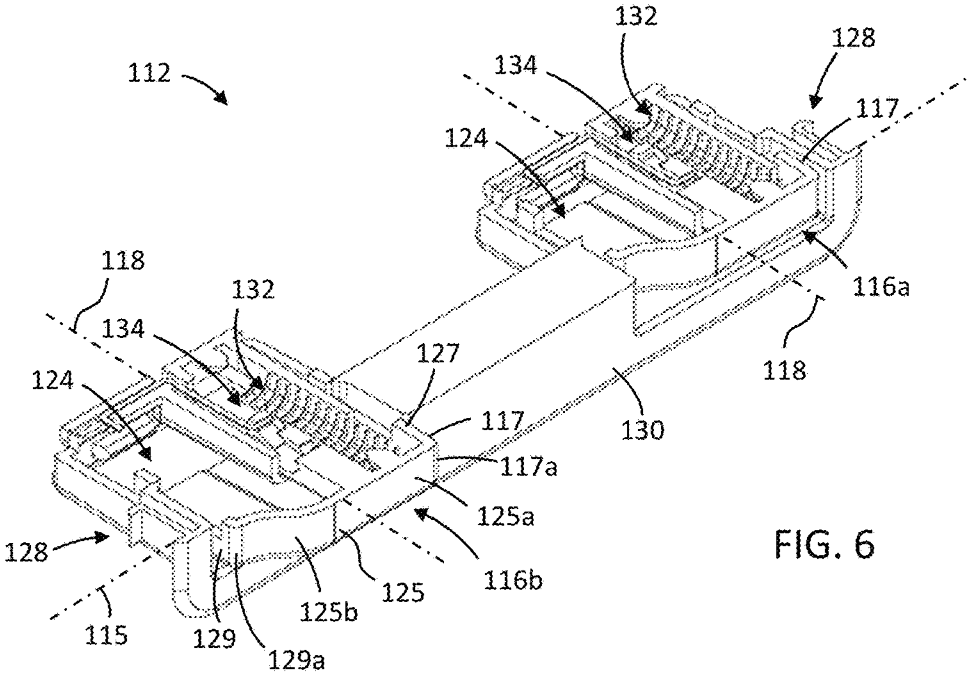
FIG. 6 is a perspective cross-sectional view of the stop device of FIG. 5B, taken along line 6-6 in FIG. 5B.

Referring to FIG. 6, in the example illustrated, the housing 114 has a pair of cavities 124 spaced apart from each other along the opening axis 108 and open in a frontward direction normal to the inboard face 120 of the first sash 110*a*. Each stop member 116 is movably retained in a corresponding cavity 124 for translation along the stop member axis 118 between the retracted and advanced positions. In the example illustrated, the stop member 116 has a front wall 125 adjacent an opening of the cavity 124 and a plurality of sidewalls 127 extending rearwardly from the front wall 125 and slidably received in the cavity 124 adjacent corresponding guide surfaces in the cavity 124 for guiding translation of the stop member 116 along the stop member axis 118.

Figure 6A:
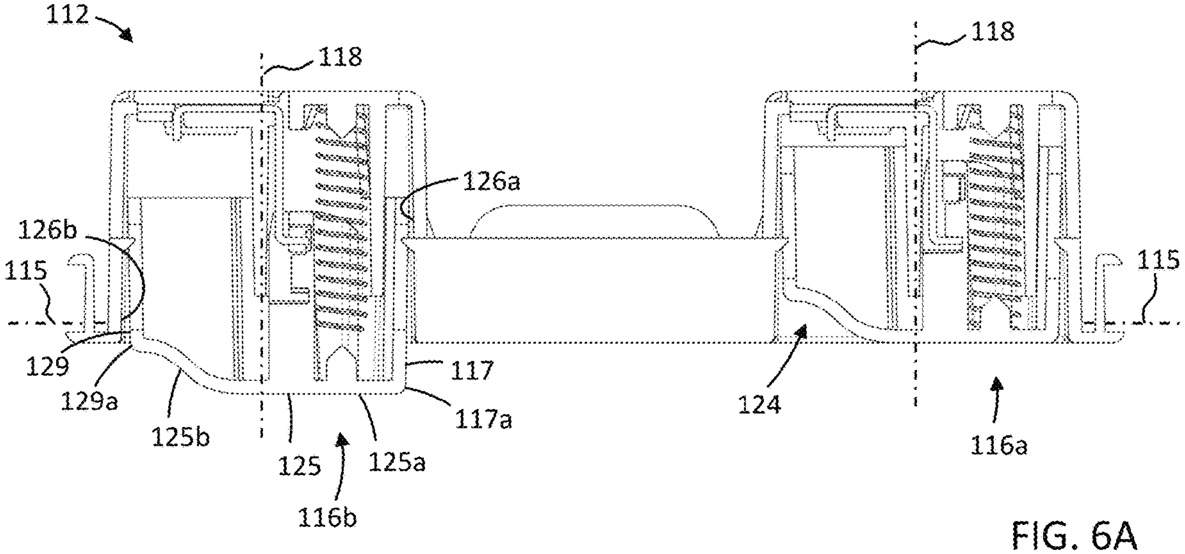
FIG. 6A is a plan view of the stop device shown in FIG. 6.

Referring to FIGS. 6 and 6A, in the example illustrated, each stop member 116 is held in fixed position along the housing axis 115 relative to the housing 114 (and the cavity 124). In the example illustrated, the stop member 116 is held axially captive (along the housing axis 115) between a pair of cavity surfaces 126*a*, 126*b* in the cavity 124 and fixed relative to the housing 114. The cavity surfaces 126*a*, 126*b* are spaced apart from and face each other along the housing axis 115. In the example illustrated, the stop member 116 has an outer sidewall surface 129 axially opposite the abutment surface 117 along the housing axis 115 and facing the cavity surface 126*b* for engagement therewith to facilitate force transfer from the stop member 116 (e.g. when engaged by the sash 110*b*) to the housing 114.

In the example illustrated, the abutment surface 117 has an abutment surface front edge 117*a* and the sidewall surface 129 has a sidewall surface front edge 129*a* positioned rearward of the abutment surface front edge 117*a* (along the axis 118). When the stop member 116 is in the advanced position, the abutment surface front edge 117*a* is spaced forward of the housing 114, and the sidewall surface front edge 129*a* is adjacent the housing 114. The front wall 125 extends along the housing axis 115 from the abutment surface front edge 117*a* to the sidewall surface front edge 129*a*. The front wall 125 has a forward portion 125*a* adjacent the abutment surface front edge 117*a* and a sloped portion 125*b* sloping rearwardly along the stop member axis 118 from the forward portion 125*a* to the sidewall surface front edge 129*a*. This can facilitate force transfer through the front wall 125 from the abutment surface 117 (e.g. when engaged by the sash 110*b*) to the housing 114 (e.g. through engagement between the sidewall surface 129 and the cavity surface 126*b*).

In the example illustrated, each cavity 124 extends along a cavity axis parallel with the stop member axis 118, and the housing has a flange portion 130 extending laterally outwardly from an upper periphery of each cavity 124 and positioned generally flush against the inboard face 120 of the first sash 110*a*.

In the example illustrated, the housing 114 has a plurality of snap fit connectors 128 extending downwardly from an underside of the flange portion 130 for securing the housing 114 in the mounting aperture 123 through a snap-fit connection. In the example illustrated, the housing 114 is of integral, unitary, one-piece construction.

In the example illustrated, the stop device 112 includes a plurality of springs 132 in the housing 114, and each spring 132 biases a corresponding stop member 116 toward the advanced position. The stop device 112 further includes a plurality of push-activated latch mechanisms 134. Each latch mechanism 134 is operable to selectively latch and maintain a corresponding stop member 116 in the retracted position (e.g. through depression of the stop member 116 from the advanced position and past the retracted position). Each latch mechanism 134 is operable to selectively release the stop member 116 from the retracted position for biased movement toward the advanced position (e.g. through depression of the stop member 116 when latched in the retracted position further past the retracted position).

Figure 4:
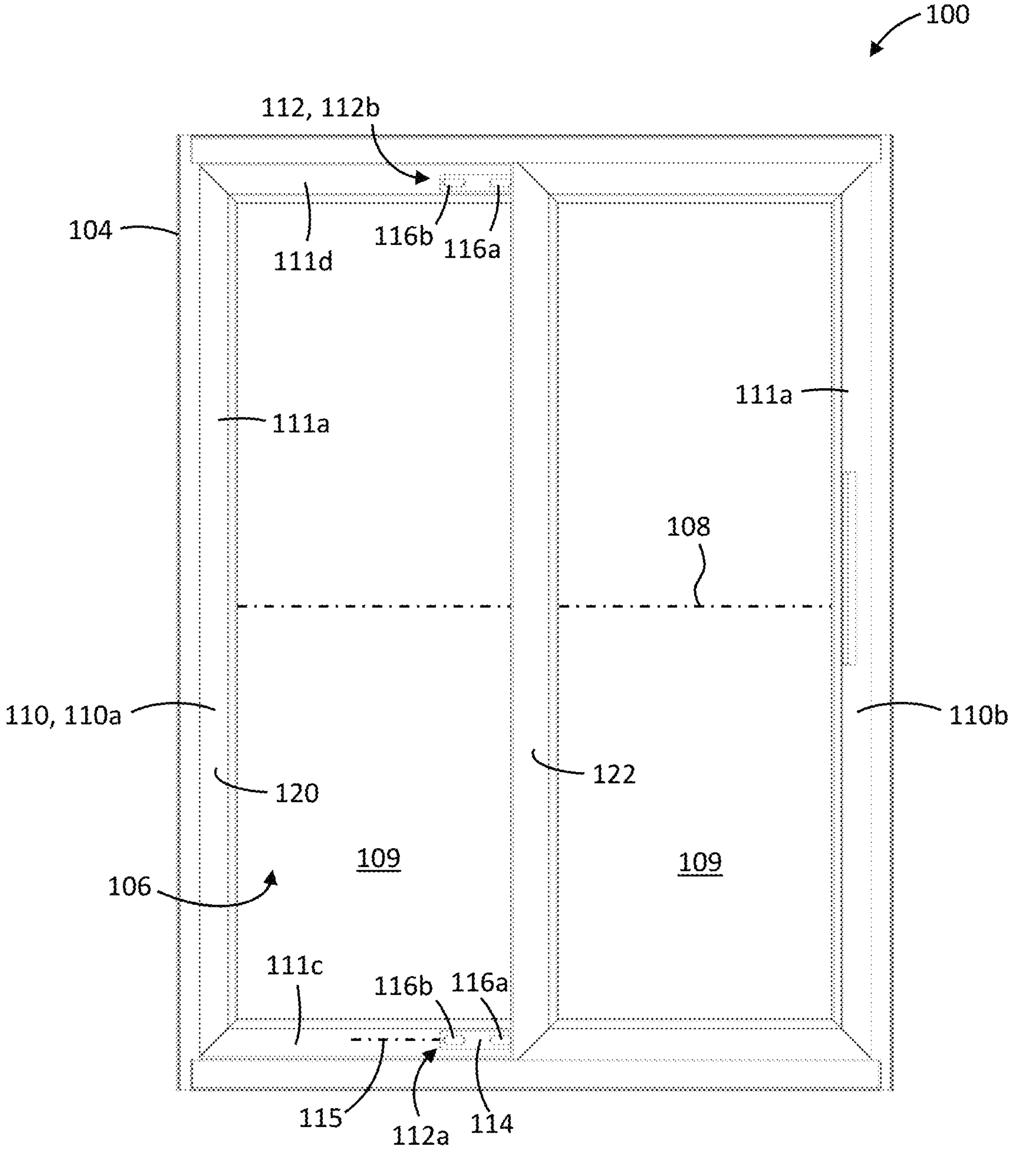
FIG. 4 is a front elevation view of the sliding sash assembly of FIG. 1.

Referring to FIG. 4, in the example illustrated, the sliding sash assembly 100 includes a pair of the stop devices 112*a*, 112*b* spaced apart from each other across the frame opening 106 perpendicular to the opening axis 108. In the example illustrated, the stop positions of each stop device 112*a*, 112*b* are in alignment with corresponding stop positions of the other stop device 112*a*, 112*b* along the opening axis 108. In the example illustrated, a first one of the stop devices 112*a* is mounted to the lower rail 111*c* of the first sash 110*a* and the second one of the stop devices 112*b* is mounted to the upper rail 111*d* of the first sash 110*a*.

Figure 7:
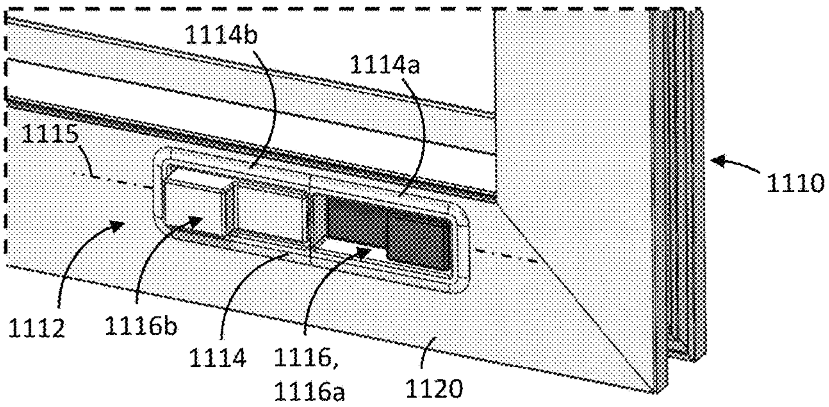
FIG. 7 is a perspective view of another example stop device for a sliding sash assembly.

Referring to FIG. 7, another example stop device 1112 is shown mounted to a sash 1110 of a sash assembly (like the assembly 100). The sash 1110 and stop device 1112 have similarities to the sash 110 and stop device 112, respectively, and like features are identified with like reference numerals, incremented by 1000.

In the example illustrated, the stop device 1112 includes a housing 1114 extending along a housing axis 1115 and mounted to an inboard face 1120 of the sash 1110. A pair of depressible stop members 1116 are movably mounted in the housing 1114 and spaced apart from each other along the housing axis 1115. Each stop member 1116 is translatable perpendicular to the housing axis 1115 independent of the other stop member 1116 between a retracted position (FIG. 8), in which the stop member 1116 is retracted into the housing 1114, and an advanced position (FIG. 9) in which the stop member 1116 projects from the housing 1114 for engagement with another sash of the sash assembly to limit movement of the sashes toward an open position.

Figure 8:
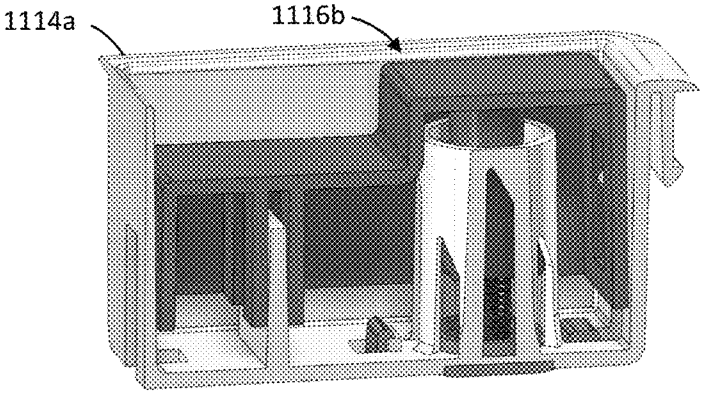
FIG. 8 is a cross-sectional view of a portion of the stop device of FIG. 7, showing a stop member of the stop device in a retracted position.
Figure 9:
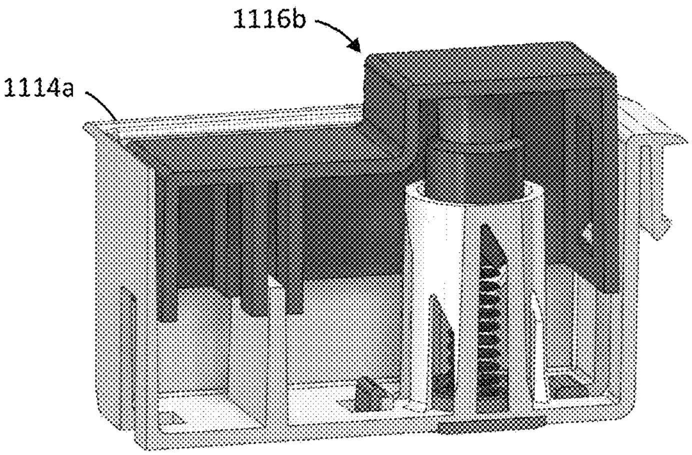
FIG. 9 is a cross-sectional view like that of FIG. 8, but showing the stop member in an advanced position.

Referring to FIGS. 7 to 9, in the example illustrated, the housing 1114 is of two-piece construction, and includes a housing first portion 1114*a* in which a first stop member 1116*a* is movably mounted, and a housing second portion 1114*b* in which a second stop member 1116*b* is movably mounted. In the example illustrated, the housing first and second portions 1114*a*, 1114*b* are identical and mounted together side-by-side and in abutting relation in a common mounting aperture in the inboard face 1120 of the sash 1110.

Figure 10:
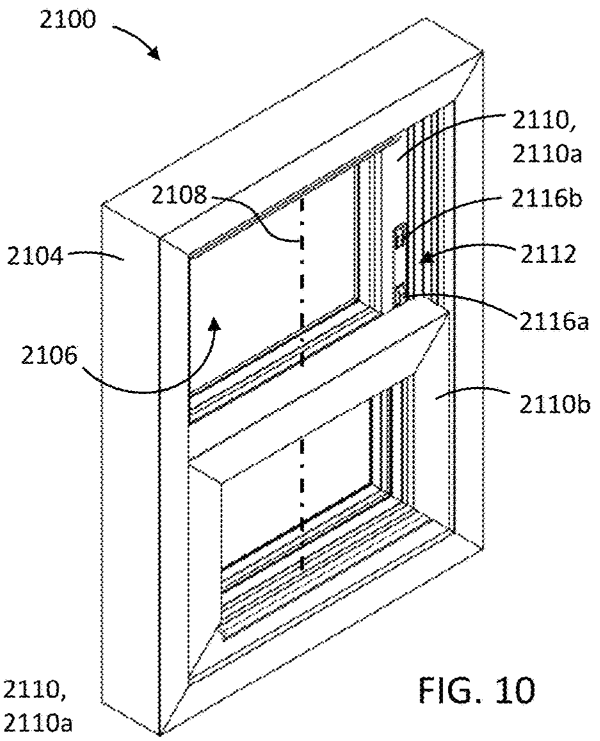
FIG. 10 is a front perspective view of another example sliding sash assembly shown in a closed configuration.
Figure 11:
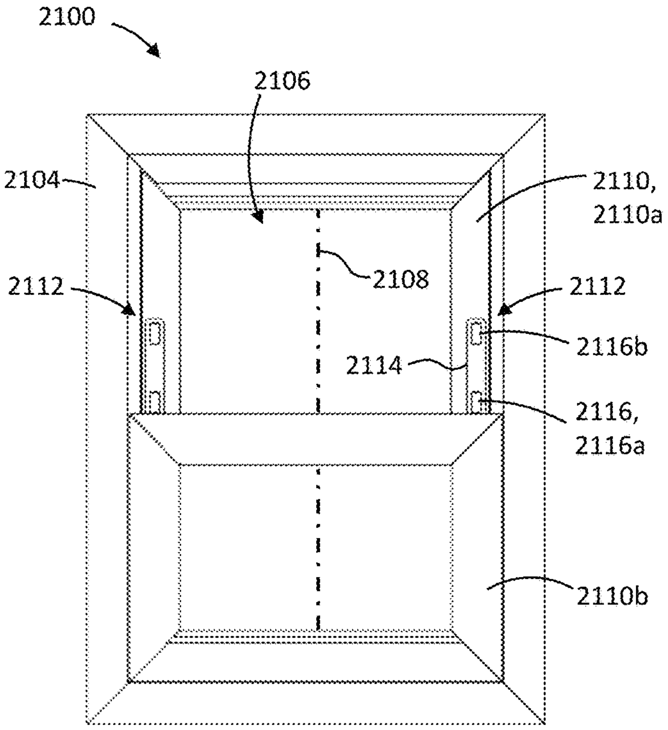
FIG. 11 is a front elevation view of the sliding sash assembly of FIG. 10.
Figure 12:
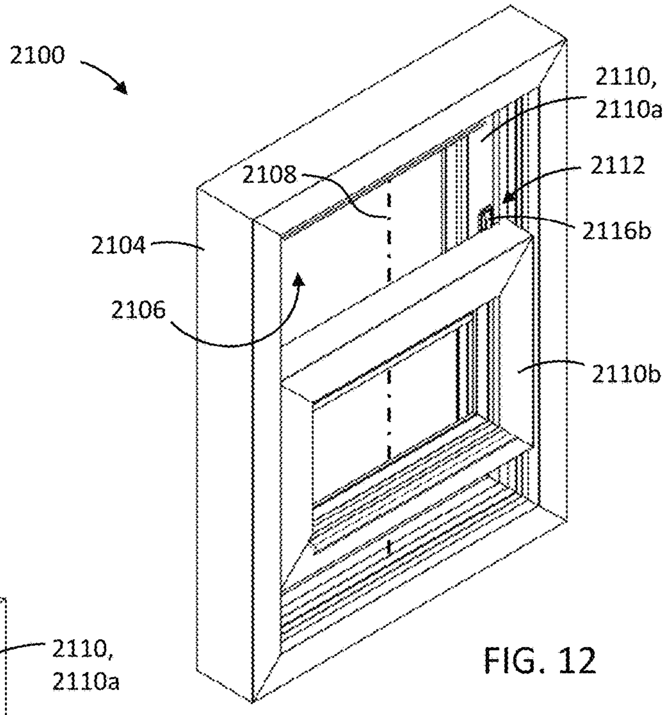
FIG. 12 is a front perspective view of the sliding sash assembly of FIG. 10, shown in a partially-open configuration.

Referring to FIGS. 10 and 11, another example sliding sash assembly 2100 is illustrated. In the example illustrated, the sliding sash assembly 2100 is configured for use as a vertically sliding window. The sliding sash assembly 2100 includes an assembly frame 2104 defining a frame opening 2106 (i.e. for a window opening in the example illustrated), and a pair of sashes 2110 mounted in the frame opening 1106. The pair of sashes 2110 include a first sash 2110*a* and a second sash 2110*b*. In the example illustrated, the first sash 2110*a* is fixed in position relative to the assembly frame 2104, and the second sash 2110*b* is slidable relative to the frame 2104 along an opening axis 2108 between a closed position (FIG. 10) and an open position.

In the example illustrated, when the second sash 2110*b* is moved from the closed position to the open position, the second sash 2110*b* slides along a travel path parallel to the axis 2108 relative to the first sash 2110*a*. In the example illustrated, the sliding sash assembly 2100 includes at least one stop device 2112. In the example illustrated, the stop device 2112 is mounted to the first (fixed) sash 2110*a*. In the example illustrated, the stop device 2112 has a housing 2114 fixed to the first sash 2110*a* and a pair of depressible stop members 2116 movably mounted in the housing 2114. In the example illustrated, the stop members 2116 include a first stop member 2116*a* and a second stop member 2116*b* spaced apart from each other along the axis 2108. Each stop member 2116 is selectively movable independent of the other stop member 2116 between a retracted position and an advanced position.

When the stop member 2116 is in the retracted position (see e.g. the second stop member 2116*b* in FIG. 10), the stop member 2116 is retracted into the housing 2114 clear of the travel path of the second sash 2110*b*. When in the advanced position (see e.g., the first stop member 2116*a* in FIG. 10), the stop member 2116 projects from the housing 2114 at a corresponding stop position along the opening axis 2108 into the travel path of the second sash 2110*b* for engagement with the second sash 2110*b* to restrict movement of the pair of sashes 2110 toward the open position.

Figure 13:
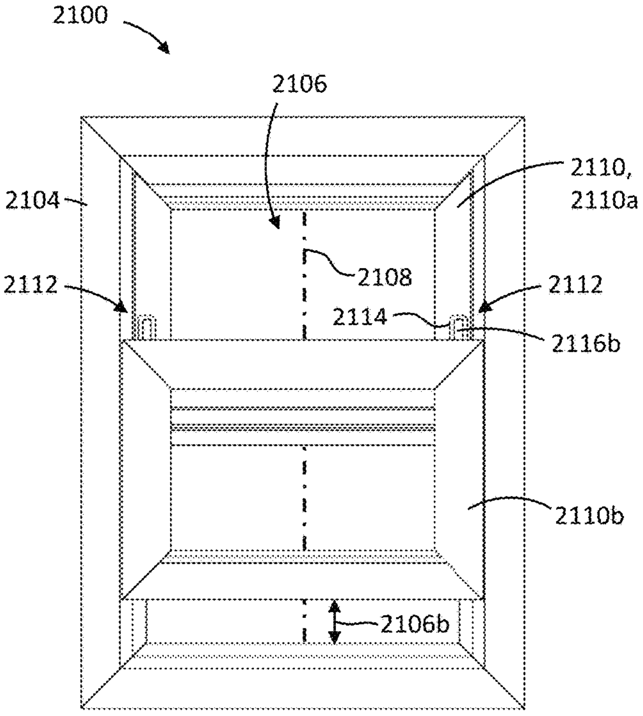
FIG. 13 is a front elevation view of the sliding sash assembly of FIG. 12.

Referring to FIG. 10, the stop position of the first stop member 2116*a* corresponds to the closed position to prevent movement of the pair of sashes 2110 relative to each other from the closed position. Referring to FIG. 13, the stop position of the second stop member 2116*b* corresponds to a partially-open position of the pair of sashes 2110. The partially-open position is between the open and closed positions for uncovering a second extent 2106*b* of the frame opening 2106 that is less than a first extent corresponding to the open position.

The invention claimed is:

1. A sliding sash assembly for use as a door or window, comprising:

a) an assembly frame defining a frame opening;

b) a pair of sashes mounted in the frame opening, the pair of sashes including a first sash and a second sash slidable relative to each other along an opening axis between a closed position, in which the pair of sashes are extended relative to each other along the opening axis to cover the frame opening, and an open position, in which the pair of sashes are retracted relative to each other along the opening axis for uncovering a first extent of the frame opening, the second sash sweeping a travel path relative to the first sash when the sashes are moved from the closed position to the open position; and c) at least one stop device including a housing fixed to the first sash and a pair of depressible stop members movably mounted in the housing, the stop members spaced apart from each other along the opening axis, each stop member selectively movable independent of the other stop member between a retracted position, in which the stop member is retracted into the housing clear of the travel path of the second sash, and an advanced position in which the stop member projects from the housing at a corresponding stop position along the opening axis into the travel path of the second sash for engagement with the second sash to restrict movement of the pair of sashes relative to each other toward the open position.

2. The sliding sash assembly of claim 1, wherein the stop members include a first stop member and a second stop member, the stop position of the first stop member corresponding to the closed position to prevent movement of the pair of sashes from the closed position, and the stop position of the second stop member corresponding to a partially-open position of the pair of sashes, the partially-open position between the open and closed positions for uncovering a second extent of the frame opening, the second extent less than the first extent.

3. The sliding sash assembly of claim 2, wherein the second extent is equal to or less than 10 cm.

4. The sash assembly of claim 1, wherein each stop member is translatable between the retracted and advanced positions along a corresponding stop member axis extending perpendicular to the opening axis.

5. The sash assembly of claim 1, wherein the stop device includes a pair of springs in the housing, each spring biasing a corresponding stop member toward the advanced position.

6. The sash assembly of claim 1, wherein the stop device includes a pair of push-activated latch mechanisms, each latch mechanism operable to selectively maintain a corresponding stop member in the retracted position and selectively release the stop member from the retracted position for biased movement toward the advanced position.

7. The sash assembly of claim 1, wherein each sash has an inboard face directed toward the other sash and an outboard face opposite the inboard face, and wherein the stop device is mounted to the inboard face of the first sash.

8. The sash assembly of claim 7, wherein the first sash has a mounting aperture in the inboard face, and the housing is positioned in the mounting aperture.

9. The sash assembly of claim 8, wherein the housing is secured in the mounting aperture through a snap-fit connection.

10. The sash assembly of claim 7, wherein the housing has a pair of cavities spaced apart from each other along the opening axis and open normal to the inboard face of the first sash, each stop member positioned in a corresponding cavity.

11. The sash assembly of claim 1, wherein the housing is of integral, unitary, one-piece construction.

12. The sash assembly of claim 1, wherein the sash assembly includes a pair of the stop devices spaced apart from each other across the frame opening perpendicular to the opening axis, and the stop positions of each stop device are in alignment with the stop positions of the other stop device along the opening axis.

13. A sliding sash assembly for use as a door or window, comprising:

a) an assembly frame defining a frame opening;

b) a pair of sashes mounted in the frame opening and slidable relative to each other along an opening axis between a closed position and an open position; and c) at least one stop device mounted adjacent one of the sashes, the stop device including a housing and a pair of depressible stop members movably mounted in the housing, the stop members spaced apart from each other along the opening axis, and each stop member selectively movable independent of the other stop member between a retracted position in which the stop member is retracted into the housing clear of the one of the sashes when the sashes move between the open and closed positions, and an advanced position in which the stop member projects from the housing for engagement with the one of the sashes to restrict movement of the sashes relative to each other toward the open position.

14. A stop device for a sliding sash assembly, the sliding sash assembly for use as a door or window and including a frame defining a frame opening and a pair of sashes mounted in the frame opening and slidable relative to each other along an opening axis between a closed position and an open position, the stop device comprising:

a) a housing extending along a housing axis for mounting adjacent a travel path of one of the sashes with the housing axis extending parallel with the opening axis; and b) a pair of depressible stop members movably mounted in the housing, the stop members spaced apart from each other along the housing axis, each stop member translatable perpendicular to the housing axis independent of the other stop member between a retracted position in which the stop member is retracted into the housing and clear of the travel path, and an advanced position in which the stop member projects from the housing into the travel path for engagement with the one of the sashes to limit movement of the sashes relative to each other toward the open position.

* * * * *